United States Patent
Whalen et al.

(10) Patent No.: US 11,549,532 B1
(45) Date of Patent: Jan. 10, 2023

(54) ASSEMBLIES, RIVETED ASSEMBLIES, METHODS FOR AFFIXING SUBSTRATES, AND METHODS FOR MIXING MATERIALS TO FORM A METALLURGICAL BOND

(71) Applicant: Battelle Memorial Institute, Richland, WA (US)

(72) Inventors: Scott A. Whalen, West Richland, WA (US); Tianhao Wang, Richland, WA (US); Piyush Upadhyay, Richland, WA (US); Keerti S. Kappagantula, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 17/014,363

(22) Filed: Sep. 8, 2020

Related U.S. Application Data

(60) Provisional application No. 62/896,768, filed on Sep. 6, 2019.

(51) Int. Cl.
*F16B 5/04* (2006.01)
*B21J 15/02* (2006.01)

(52) U.S. Cl.
CPC .................. *F16B 5/04* (2013.01); *B21J 15/02* (2013.01)

(58) Field of Classification Search
CPC ................... B29C 65/608; B29C 65/60; Y10T 29/49947; Y10T 29/49906; Y10T 29/49826
See application file for complete search history.

(56) References Cited

U.S. PATENT DOCUMENTS

| 3,432,369 A | 3/1969 | Naastepad |
| 3,640,657 A | 2/1972 | Rowe et al. |

(Continued)

FOREIGN PATENT DOCUMENTS

| EP | 2990178 | 2/2016 |
| JP | 2003-275876 | 9/2003 |

(Continued)

OTHER PUBLICATIONS

Nakamura et al., "Tool Temperature and Process Modeling of Friction Stir Welding", (2018) Modern Mechanical Engineering, 8, 78-94.

(Continued)

*Primary Examiner* — Jason L Vaughan
*Assistant Examiner* — Amanda Kreiling
(74) *Attorney, Agent, or Firm* — Wells St. John P.S.

(57) ABSTRACT

Riveted assemblies are provided that can include a substrate extending between two ends to define opposing substrate surfaces having a first opening extending between the opposing substrate surfaces; a metal-comprising substrate extending between two ends to define opposing metal-comprising substrate surfaces having a second opening extending between the opposing metal-comprising substrate surfaces. The riveted assemblies can further provide that the first and second openings complement one another when the substrate and metal-comprising substrate are engaged; and a rivet shaft extends through the openings and engages the substrate with the rivet head and the metal-comprising substrate with the rivet stop head, at least a portion of the stop head being mixed with, and forming a metallurgical bond with the metal-comprising substrate. Assemblies are provided that can include a rivet stop head mixed with, and metallurgically bonded with a metal-comprising substrate. Methods for affixing substrates to one another are also provided. The methods can include providing a substrate (Continued)

defining an opening configured to receive a rivet shaft; providing a metal-comprising substrate defining a complimentary opening; operatively engaging the substrates with the rivet shaft; and forming a stop head from the rivet shaft to affix the substrates. The method further includes that the stop head mixes with, and forms a metallurgical bond with the metal-comprising substrate. Methods for mixing materials to form a metallurgical bond are also provided. The methods can include forming a metallurgical bond between a stop head of a rivet and a metal-comprising substrate.

17 Claims, 17 Drawing Sheets

(56) References Cited

U.S. PATENT DOCUMENTS

| | | | |
|---|---|---|---|
| 3,661,726 | A | 5/1972 | Denes |
| 3,684,593 | A | 8/1972 | Benz et al. |
| 3,884,062 | A | 5/1975 | Green |
| 3,892,603 | A | 7/1975 | Reid |
| 3,933,536 | A | 1/1976 | Doser et al. |
| 3,977,918 | A | 8/1976 | Paladino et al. |
| 3,989,548 | A | 11/1976 | Morris |
| 4,287,749 | A | 9/1981 | Bachrach et al. |
| 4,300,378 | A | 11/1981 | Thiruvarudchelvan |
| 4,585,473 | A | 4/1986 | Narasimhan et al. |
| 4,778,542 | A | 10/1988 | Clemens |
| 4,801,340 | A | 1/1989 | Inoue et al. |
| 4,808,224 | A | 2/1989 | Anderson et al. |
| 4,892,596 | A | 1/1990 | Chatterjee |
| 4,985,085 | A | 1/1991 | Chatterjee |
| 5,026,438 | A | 6/1991 | Young et al. |
| 5,089,060 | A | 2/1992 | Bradley et al. |
| 5,242,508 | A | 9/1993 | McCallum et al. |
| 5,262,123 | A | 11/1993 | Thomas et al. |
| 5,283,130 | A | 2/1994 | Bradley et al. |
| 5,437,545 | A | 8/1995 | Hirai |
| 5,461,898 | A | 10/1995 | Lessen |
| 5,470,401 | A | 11/1995 | McCallum et al. |
| 5,737,959 | A | 4/1998 | Korbel et al. |
| 5,739,498 | A * | 4/1998 | Sunamoto .......... B23K 11/0046 219/78.15 |
| 6,022,424 | A | 2/2000 | Sellers et al. |
| 6,036,467 | A | 3/2000 | Jameson |
| 6,638,462 | B2 | 10/2003 | Davidson et al. |
| 6,843,405 | B2 | 1/2005 | Okamoto et al. |
| 6,940,379 | B2 | 9/2005 | Creighton |
| 7,096,705 | B2 | 8/2006 | Segal |
| 7,322,508 | B2 | 1/2008 | Chang |
| 7,954,692 | B2 | 6/2011 | Fukuda |
| 8,016,179 | B2 | 9/2011 | Burford |
| 8,240,540 | B2 * | 8/2012 | Tanaka .................. B21J 15/027 228/2.1 |
| 8,313,692 | B2 | 11/2012 | Somekawa et al. |
| 10,189,063 | B2 | 1/2019 | Lavender et al. |
| 10,369,748 | B2 | 8/2019 | Whalen et al. |
| 10,695,811 | B2 | 6/2020 | Joshi et al. |
| 2002/0029601 | A1 | 3/2002 | Kwok |
| 2004/0238501 | A1 | 12/2004 | Kawazoe et al. |
| 2006/0005898 | A1 | 1/2006 | Lui et al. |
| 2008/0029581 | A1 | 2/2008 | Kumagai et al. |
| 2008/0202653 | A1 | 8/2008 | Ignberg |
| 2008/0251571 | A1 | 10/2008 | Burford |
| 2009/0072007 | A1 | 3/2009 | Nagano |
| 2009/0291322 | A1 | 11/2009 | Watanabe et al. |
| 2010/0012706 | A1* | 1/2010 | Fukuda .................. B21J 5/063 228/2.3 |
| 2010/0059151 | A1 | 3/2010 | Iwamura et al. |
| 2010/0132430 | A1 | 6/2010 | Tsai et al. |
| 2011/0104515 | A1 | 5/2011 | Kou et al. |
| 2011/0132970 | A1 | 6/2011 | Nakagawa et al. |
| 2011/0309131 | A1 | 12/2011 | Hovanski et al. |
| 2012/0006086 | A1 | 1/2012 | Manchiraju et al. |
| 2012/0052322 | A1 | 3/2012 | Hatakeyama et al. |
| 2012/0168045 | A1 | 7/2012 | Ihara et al. |
| 2013/0075452 | A1 | 3/2013 | Burford |
| 2014/0002220 | A1 | 1/2014 | Johnson et al. |
| 2014/0102161 | A1 | 4/2014 | Stewart |
| 2014/0283574 | A1 | 9/2014 | Lavender et al. |
| 2015/0075242 | A1 | 3/2015 | Eller et al. |
| 2015/0115019 | A1 | 4/2015 | Pascal et al. |
| 2016/0008918 | A1 | 1/2016 | Burford |
| 2016/0167353 | A1 | 6/2016 | Fan et al. |
| 2016/0175981 | A1 | 6/2016 | Kandasamy |
| 2016/0175982 | A1 | 6/2016 | Kandasamy et al. |
| 2016/0228932 | A1 | 8/2016 | Hayashi et al. |
| 2017/0008121 | A1 | 1/2017 | Li |
| 2017/0136686 | A1 | 5/2017 | Ueno et al. |
| 2017/0163135 | A1 | 6/2017 | Emberton et al. |
| 2017/0216961 | A1 | 8/2017 | Utter et al. |
| 2017/0225265 | A1 | 8/2017 | Ito et al. |
| 2017/0304933 | A1 | 10/2017 | Miles et al. |
| 2018/0311713 | A1 | 11/2018 | Joshi et al. |
| 2018/0354231 | A1 | 12/2018 | Iwase |
| 2018/0369889 | A1 | 12/2018 | Zhang et al. |

FOREIGN PATENT DOCUMENTS

| | | |
|---|---|---|
| JP | 2007-222925 | 9/2007 |
| WO | WO PCT/US2019/040730 | 10/2019 |
| WO | WO PCT/US2019/040730 | 1/2021 |
| WO | WO PCT/US2020/053168 | 2/2021 |

OTHER PUBLICATIONS

Zhang et al., "Numerical Studies on Effect of Axial Pressure in Friction Stir Welding", (2007) Science and Technology of Welding and Joining, vol. 12, No. 3, United Kingdom, pp. 226-248.

Office Action for U.S. Appl. No. 14/222,468, filed Mar. 21, 2014, First named inventor Curtis A. Lavender, Notification dated Nov. 6, 2015, 10 pages.

Office Action for U.S. Appl. No. 14/222,468, filed Mar. 21, 2014, First named inventor Curtis A. Lavender, Notification dated Apr. 1, 2016, 10 pages.

Office Action for U.S. Appl. No. 14/222,468, filed Mar. 21, 2014, First named inventor Curtis A. Lavender, Notification dated May 20, 2016, 3 pages.

Office Action for U.S. Appl. No. 14/222,468, filed Mar. 21, 2014, First named inventor Curtis A. Lavender, Notification dated Jan. 26, 2017, 9 pages.

Office Action for U.S. Appl. No. 14/268,220, filed May 2, 2014, First Named Inventor Jun Cui, Notification dated Dec. 1, 2015, 7 pages.

Rodewald et al. "Top Nd—Fe—B Magnets with Greater Than 56 MGOe Energy Density and 9.8 kOe Coercivity", IEEE Transactions on Magnetics, vol. 38, No. 5, 2002, United States, pp. 2955-2957.

Saha, "Aluminum Extrusion Technology, Chapter 1, Fundamentals of Extrusion", The Materials Information Society, ASM International, 2000, United States, pp. 1-29.

ThomasNet.com, https:/www.thomasnet.com/articles/custom-manufacturing-fabricating/friction-stir-welding/ Feb. 10, 2011 (Year: 2011).

Trang et al., "Designing a Magnesium Alloy with High Strength and High Formability", Nature Communications, 2018, United Kingdom, 6 pages.

Bozzi et al., "Intermetallic Compounds in Al 6016/IF-Steel Friction Stir Spot Welds", Materials Science and Engineering, 2010, Netherlands, pp. 4505-4509.

Gann, J.A., "Magnesium Industry's Lightest Structural Metal", SAE Transactions, vol. 25-26, 1930-1931, United States, pp. 620-634, 641.

Kaiser et al., "Anisotropic Properties of Magnesium Sheet AZ31", Materials Science Forum, vols. 419-422, Switzerland, 2003, pp. 315-320.

(56) References Cited

OTHER PUBLICATIONS

Luo, Alan, "Magnesium: Current and Potential Automotive Applications", JOM, 54(2), 2002, United States, pp. 42-48.
Abu-Farha, "A Preliminary Study on the Feasibility of Friction Stir Back Extrusion", Scripta Materials, 66, 2012, United States, 615-618.
Amancio-Filho, et al., "Joining of Polymers and Polymer-Metal Hybrid Structures: Recent Developments and Trends", Polymer Engineering and Science 2009, pp. 1461-1476, United States.
Cole et al., "Lightweight materials for Automotive Applications", Materials Characterization, 35, 1995, United States, pp. 3-9.
Evans, W.T., et al., Friction Stir Extrusion: A new process for joining dissimilar materials, Manufacturing Letters, 5, 2015, United States, pp. 25-28.
Hammond, Vincent H., et al., "Equal-Channel Angular Extrusion of a Low-Density High-Entropy Alloy Produced by High-Energy Cryogenic Mechanical Alloying", JOM. vol. 66, No. 10, United States, 2014, pp. 2021-2029.
Kuo et al., "Fabrication of High Performance Magnesium/Carbon-Fiber/PEEK/Laminated Composites", Materials Transactions, vol. 44, No. 8 (2003), Japan, pp. 1613-1619.
Leitao, C., et al., Aluminum-steel lap joining by multipass friction stir welding, Materials and Design, 106, 2016, United States, pp. 153-160.
Liu et al., "A Review of Dissimilar Welding Techniques for Magnesium Alloys to Aluminum Alloys", Materials, 7, 2014, United States, pp. 3735-3757.
Liu, Bin, et al., "Microstructure and mechanical properties of equimolar FeCoCrNi high entropy alloy prepared via powder extrusion", Intermetallics 75 (2016), United States, pp. 25-30.
Martinsen et al., "Joining of Dissimilar Materials", CIRP Annals—Manufacturing Technology, 2015, United States, 21 pages.

\* cited by examiner

ASSEMBLIES, RIVETED ASSEMBLIES, METHODS FOR AFFIXING SUBSTRATES, AND METHODS FOR MIXING MATERIALS TO FORM A METALLURGICAL BOND

CROSS REFERENCE TO RELATED APPLICATION

This application claims priority to and the benefit of U.S. Provisional Patent Application Ser. No. 62/896,768 filed Sep. 6, 2019, entitled "Apparatus, Assemblies, and Methods for Joining Dissimilar Materials", the entirety of which is incorporated by reference herein.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

TECHNICAL FIELD

The present disclosure relates to the joining of materials. In particular embodiments, the present disclosure provides assemblies, riveted assemblies, methods for affixing substrates, and methods for mixing materials to form a metallurgical bond. The present disclosure also relates to joining of magnesium and aluminum alloys, or other metals, to other materials including metals, plastics, carbon fiber composites, or ceramics for example.

BACKGROUND

In recent decades, requirements to improve fuel efficiency in the transport industries have necessitated a higher usage of lightweight structural materials such as magnesium (Mg) and aluminum (Al) and their alloys since their densities are around 65% and 74% of that of common mild steel respectively.

There are large differences in physical and mechanical properties of materials to be joined such as Al to steel and/or Mg to carbon fiber reinforced polymers (CFRP). These differences can make joining materials challenging when using various fusion-based welding techniques. With fusion based welding, rapid formation of brittle intermetallic compounds at the metal-metal interface and melting at the metal-CFRP interface can lead to interfacial fracture under mechanical loading.

Mechanical joining, such as conventional riveting, clinching and bolting have not formed a metallurgical bond between the fastener and metal sheet being fastened. For example, joints made with conventional rivets, threaded fasteners and bolted joints do not seal the interfaces between the rivet head and metal sheet against penetration of corrosive electrolyte. In addition, the lack of metallurgical bonding can introduce compliance which can lead to failure under shock and vibration loading. With various welding techniques including solid-state and fusion welding methods, brittle intermetallic compounds such as $Al_xMg_y$ and $Al_xFe_x$ can form rapidly at the Mg/Al and Al/Steel interfaces respectively, which can facilitate a brittle joining interface. Additionally, large differences in physical, chemical, and mechanical properties between metals and polymers make joining Al or Mg to CFRP challenging by applying conventional welding methods.

Rivet materials used in the aerospace and automotive industries are typically alloys of Al or steel. High-strength 2XXX and 7XXX Al alloys in tempered conditions are preferred due to their high strength to weight ratio. However, with conventional impact riveting at room temperature, it is not possible to rivet tempered 2XXX and 7XXX Al alloys due to their low formability. This is also the case for Mg alloys. In practice, 2024 Al rivets must be stored below 0° C. immediately after annealing to stop the age hardening process and are referred to as "Ice Box" rivets. Furthermore, riveting of these 2024 rivets must be performed within 30 minutes after removal from cold storage or they become too brittle to deform during impact riveting thus complicating the manufacturing process. In addition, 7XXX is considered not able to be riveted at room temperature by conventional impact riveting due to low ductility and hot riveting of 7XXX results in dramatically decreased strength due to second phase coarsening. Mg alloys are only able to be riveted at elevated temperature.

The present disclosure provides techniques to join materials, embodiments of which can overcome the above stated challenges.

SUMMARY

Riveted assemblies are provided that can include a substrate extending between two ends to define opposing substrate surfaces having a first opening extending between the opposing substrate surfaces; a metal-comprising substrate extending between two ends to define opposing metal-comprising substrate surfaces having a second opening extending between the opposing metal-comprising substrate surfaces. The riveted assemblies can further provide that the first and second openings complement one another when the substrate and metal-comprising substrate are engaged; and a rivet shaft extends through the openings and engages the substrate with the rivet head and the metal-comprising substrate with the rivet stop head, at least a portion of the stop head forming a metallurgical bond with the metal-comprising substrate.

Assemblies are provided that can include a rivet stop head metallurgically bonded with a metal-comprising substrate.

Methods for affixing substrates to one another are also provided. The methods can include providing a substrate defining an opening configured to receive a rivet shaft; providing a metal-comprising substrate defining a complimentary opening; operatively engaging the substrates with the rivet shaft; and forming a stop head from the rivet shaft to affix the substrates. The method further includes that the stop head forms a metallurgical bond with the metal-comprising substrate.

Methods for mixing materials to form a metallurgical bond are also provided. The methods can include forming a metallurgical bond between a stop head of a rivet and a metal-comprising substrate.

DRAWINGS

Embodiments of the disclosure are described below with reference to the following accompanying drawings.

DESCRIPTION

Figure 1:
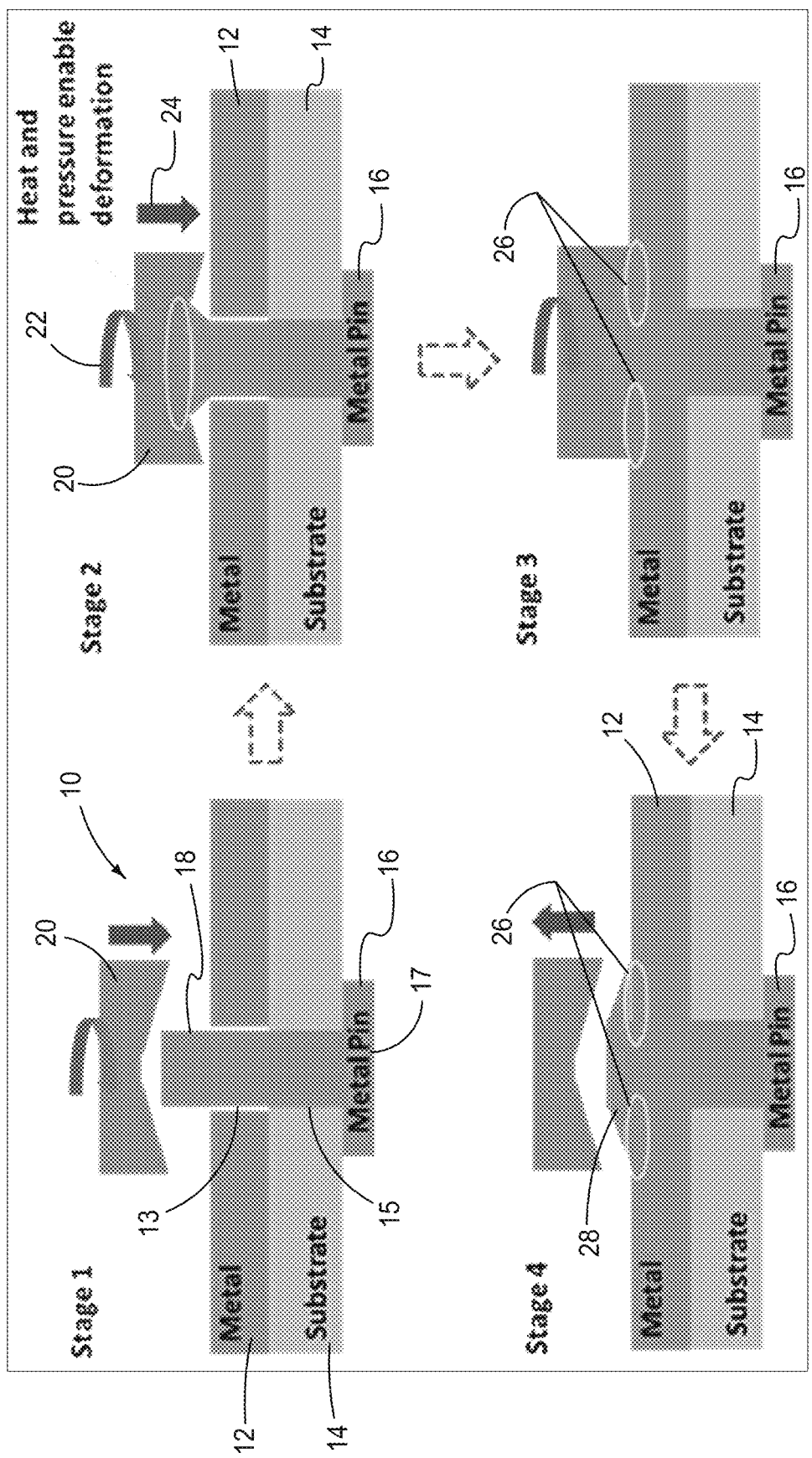
FIG. 1 is a depiction of the preparation of a riveted assembly and riveting process according to an embodiment of the disclosure.

This disclosure is submitted in furtherance of the constitutional purposes of the U.S. Patent Laws "to promote the progress of science and useful arts" (Article 1, Section 8).

Riveting still plays a very important role in manufacturing industry. The increased usage of multi-material and hybrid structures has boosted the requirement for joining dissimilar materials, and riveting can be suitable for joining dissimilar or similar materials. In accordance with example embodiments of the present disclosure, a rotational hammer riveting (RHR) technique can be used and applied to rivets to obtain rivet stop heads that are metallurgically joined or bonded to an underlying metal-comprising material like a magnesium or aluminum sheet. Example implementations can utilize RHR to generate heat and pressure to provide plastic shear deformation of the rivet shaft and/or the metal-comprising material while a rotating tool or apparatus plunges on the rivet shafts.

This joining method for materials such as Mg/Al Al/Steel and Mg/CFRP, as examples, can provide for multi-material assemblies that decrease vehicle weight while offering more flexibility for designers. With RHR, direct joining between metal-comprising substrates and other substrates including the same or other metal-comprising substrates such as Mg/Al, Al/Steel and Mg/CFRP can be replaced by joining a rivet stop head and metal-comprising top sheet. Through heat generated by friction and plastic deformation of a rivet shaft, RHR creates a mixed interface and metallurgical bond between the rivet stop head and the metal-comprising sheet which can seal corrosive electrolyte from penetrating around the rivet head for example. Heretofore a rivet stop head to sheet bond has not been achievable using conventional hot or cold linear hammer riveting.

RHR techniques are provided to directly rivet tempered Al alloys of 2024 and 7075 and alloys of Mg such as ZK60 and AZ31. Friction between a high-speed rotating tool and tempered Al alloy or magnesium alloy facilitates a desired temperature and strain rate for deforming the tempered Al or Mg alloys that can occur without buckling or fracturing. Formability of tempered Al and Mg alloys can be significantly improved with increased temperature and strain rate that occurs during RHR in comparison to conventional impact riveting. Furthermore, riveting speed can be increased by ~10 times as compared to conventional impact riveting process.

In accordance with example implementations, Mg (AZ31), CFRP and Al (AA7055) sheets with thickness of 2.4, 3.1 and 2.6 mm, respectively, can be used. The CFRP, commercially available as Ultramid Advanced N XA-3454, can be a 40% short carbon fiber reinforced grade of PA9T obtained from BASF Corporation. Mechanical properties of AZ31, CFRP, and AA7055 are listed in Table 1 below.

TABLE 1

Mechanical properties of base materials

| Materials | Tensile strength (MPa) | Elongation (%) | Thickness (mm) |
|---|---|---|---|
| AZ31 | 260 | 15 | 2.35 |
| CFRP | 274 | 1 | 3.1 |
| AA7055 | 640 | 10 | 2.6 |

Accordingly, methods for joining to materials are provided. The methods can include riveting a first material to a second material using a rivet. In accordance with example implementations, the rivet metallurgically bonds to at least one of the first or second materials. Assemblies are also provided that can include a first material riveted to a second material with the rivet being metallurgically bonded to at least one the first or second materials. In accordance with example implementations, Al or Mg as rivet materials are can be favorable when viewed in the context of the materials need to be joined.

The assemblies and methods of the present disclosure will be described with reference to FIGS. 1-17.

Referring first to FIG. 1, a series of stages describing the riveting process is shown that includes a stage 1 wherein a metal-comprising substrate 12 is operatively engaged with a substrate 14. As depicted, there are two substrates. However, additional substrates/materials can be included in the process or assembly. The disclosure should not be read to limit the scope to only two substrates. Between these materials can extend opposing surfaces in metal-comprising substrate 12 and opposing surfaces in substrate 14. Metal-comprising substrate 12 can define an opening 13, and substrate 14 can define an opening 15. Within this opening and/or operatively engaged therein can be a rivet 16. Rivet 16 can have a head 17 that includes a shaft 18. As shown, rivet 16 includes a head 17. While the disclosure describes the formation of a stop head 28, there can also be formed an opposing stope head from the head 17 or from shaft 18, thereby creating opposing stop heads that form metallurgical bonds with substrates. Above shaft 18 and operatively aligned above shaft 18 can be a tool 20 that can be provided for compression and rotational force. As shown in this stage 1, shaft 18 can extend outwardly from the upper surface of metal-comprising substrate 12. However, shaft 18 may reside below the upper surface of metal-comprising substrate 12, for example.

In accordance with example implementations, compression force 24 and rotational force 22 of tool 20 can be applied to shaft 18 of rivet 16. This force can plasticize and/or deform the shaft 18 to create a mix of metal between the metal-comprising substrate 12 and the material of rivet shaft 18. In accordance with example implementations, the compressive and rotational force can create a stop head 28, and that stop head can be mixed with, and metallurgically bonded to, the metal-comprising substrate 12 at portions 26, for example.

Figure 2:
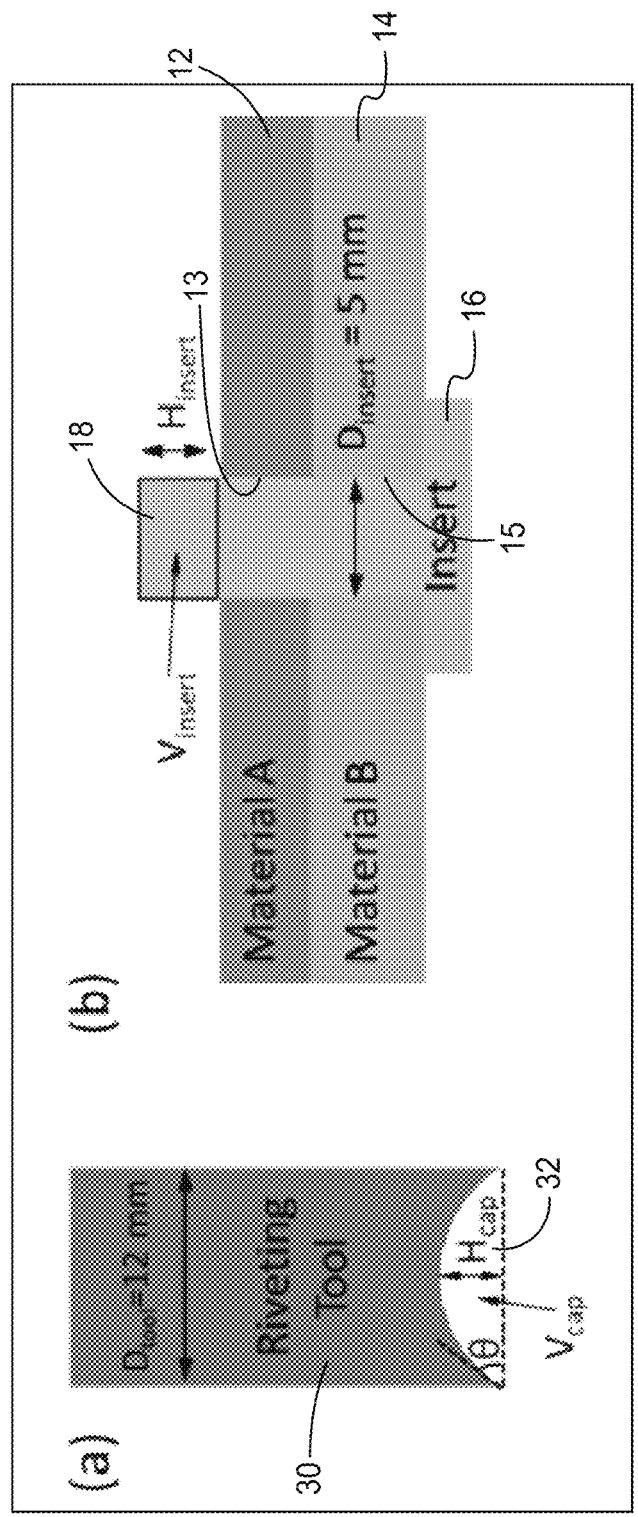
FIG. 2 is a 2-D depiction and exemplary dimensions of a riveting tool and an assembly according to an embodiment of the disclosure.

Referring to FIG. 2, tool 20 diameter ($D_{tool}$) and tool concave 32 degree ($\theta$) of the RHR tool can have a cap volume ($V_{cap}$) and cap height ($H_{cap}$). Referring to the assemblies of the present disclosure, the shaft 18 portion of rivet 16 extending above metal-comprising substrate 12 can be the height ($H_{insert}$) and this extended portion can have a volume ($V_{insert}$) of Mg or Al alloys, for example. An example schematic of cap volume 32 is displayed in FIG. 2 (a) and (b), as another example.

Figure 3:
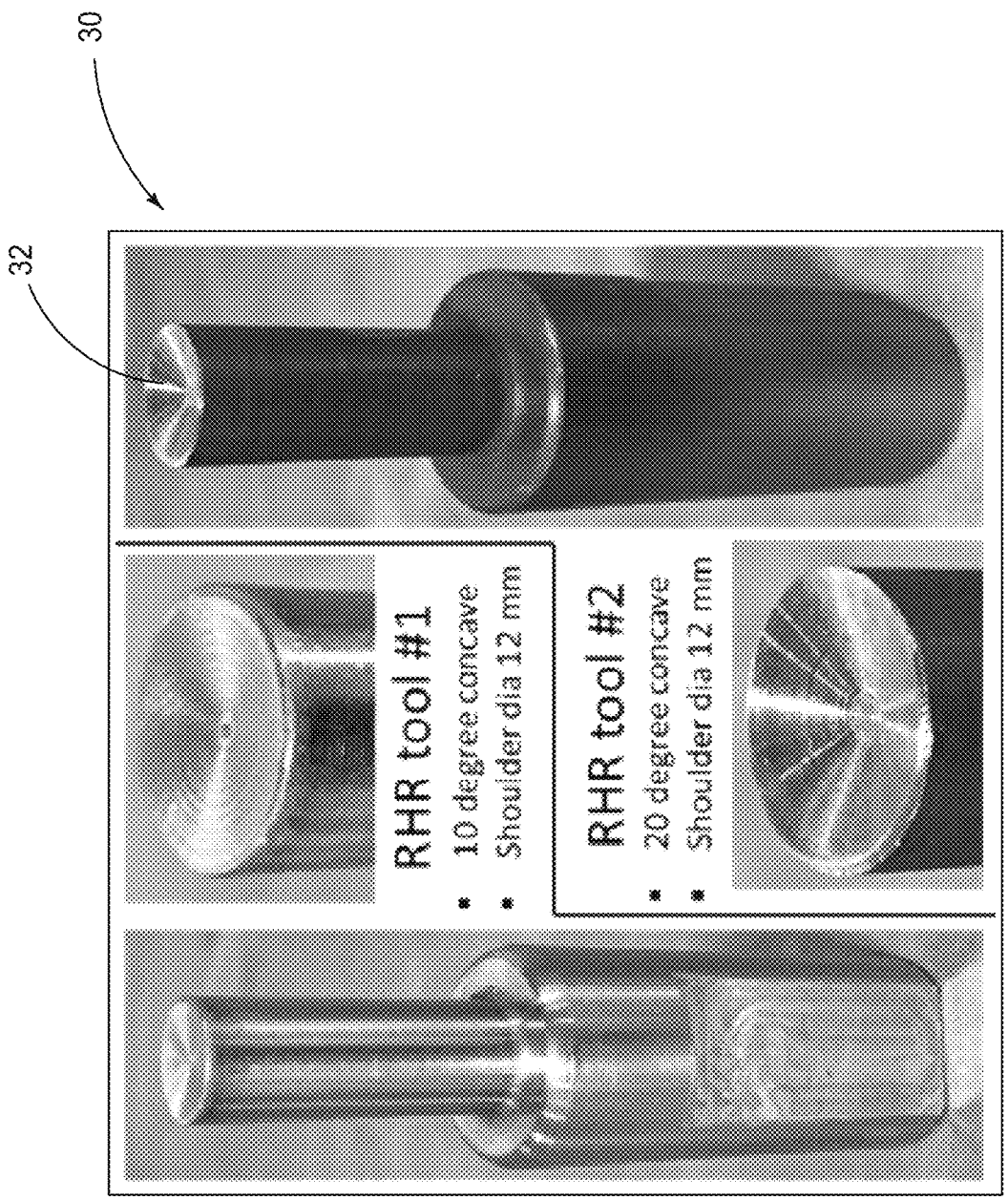
FIG. 3 is a depiction of a riveting tool according to an embodiment of the disclosure.

Two example tools are shown in FIG. 3. As shown in FIG. 3, tool #1 can have a ($\theta=10°$), $H_{cap}$ of 0.5 mm and $V_{cap}$ of 29.4 mm$^3$. Tool #2 can have a ($\theta=20°$), $H_{cap}$ of 1.1 mm and $V_{cap}$ of 60.8 mm$^3$. The RHR tools 20 employed can be made of H13 steel, for example. The diameter of the both tools can be 12 mm.

Figure 4:
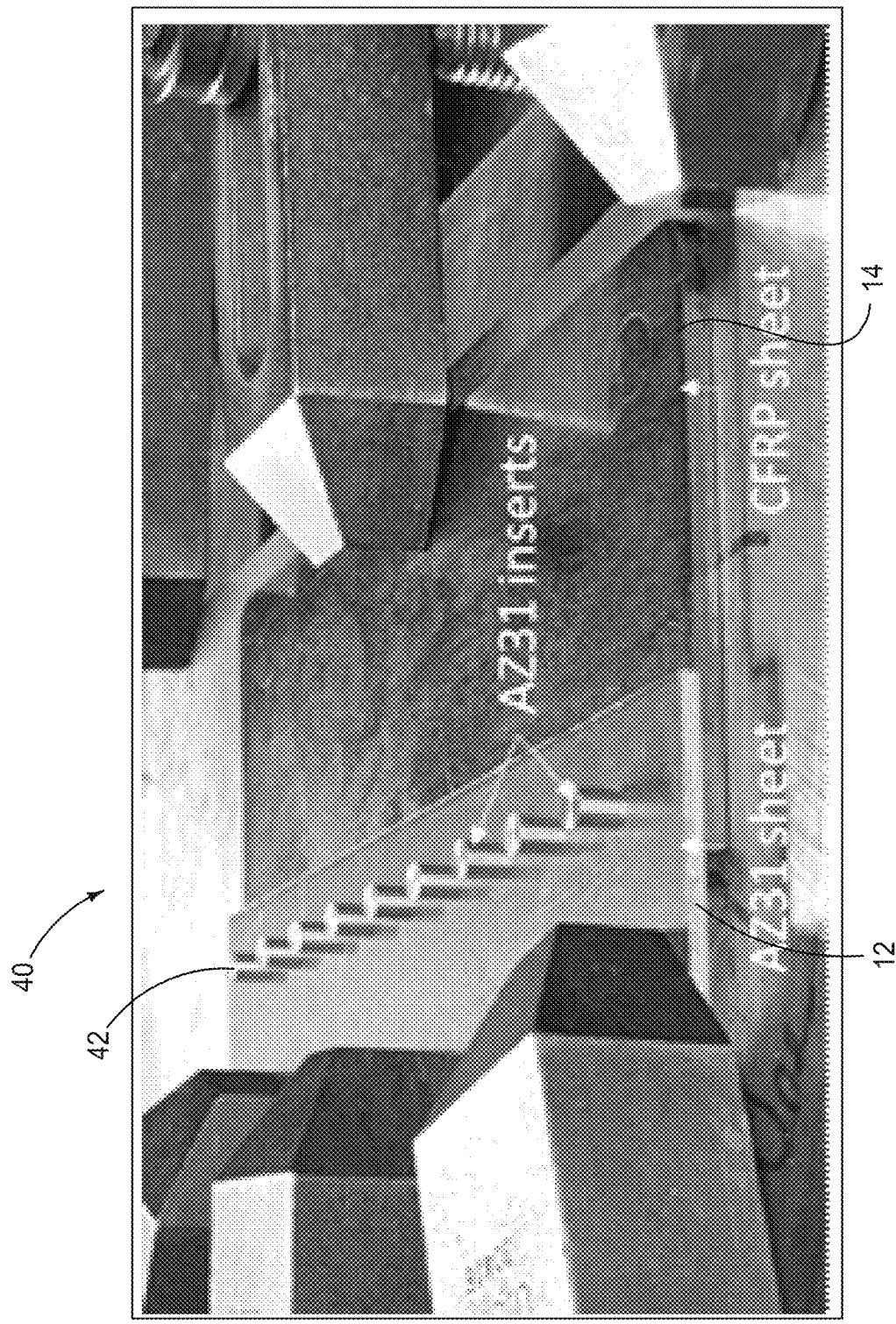
FIG. 4 is a depiction of a series of rivets engaged with substrates prior to applying the riveting process according to an embodiment of the disclosure.

Referring next to FIG. 4, a series of rivets inserts 40 are show with the individual rivet shafts 42 aligned between metal-comprising substrate 12 and substrate 14. In accordance with example implementations of the apparatus and methods of the present disclosure, holes can be predrilled on the metal comprising substrate 12 (AZ31), and substrate 14 (CFRP) and AZ31 sheets with a rivet shaft diameter of 5 mm and center to center spacing of 15 mm. Openings can be round, non-circular, tapered, or other geometry, and rivet shafts can be complimentary to that geometry. In accordance with example implementations, when joining AZ31/CFRP sheets with AZ31 inserts, the bottom CFRP sheet which can be replaced with AA7055, steel, thermoset composite, ceramic, or other sheet materials. AZ31 inserts can be penetrated through bottom sheet, and the height of AZ31 inserts may be designated so they may contain sufficient volume to form a rivet head during the joining process as shown and discussed in FIG. 2, for example. For AZ31/CFRP sheets riveted using AZ31 inserts obtained with tool #1, the rotation rate can be 1000 RPM and plunge speed is 60 mm/min. Comparably, for AZ31/AA7055 sheets joined using AZ31 rivets obtained with tool #1, the rotation rate can be 1000 RPM and plunge speed is 780 mm/min.

Figure 5:
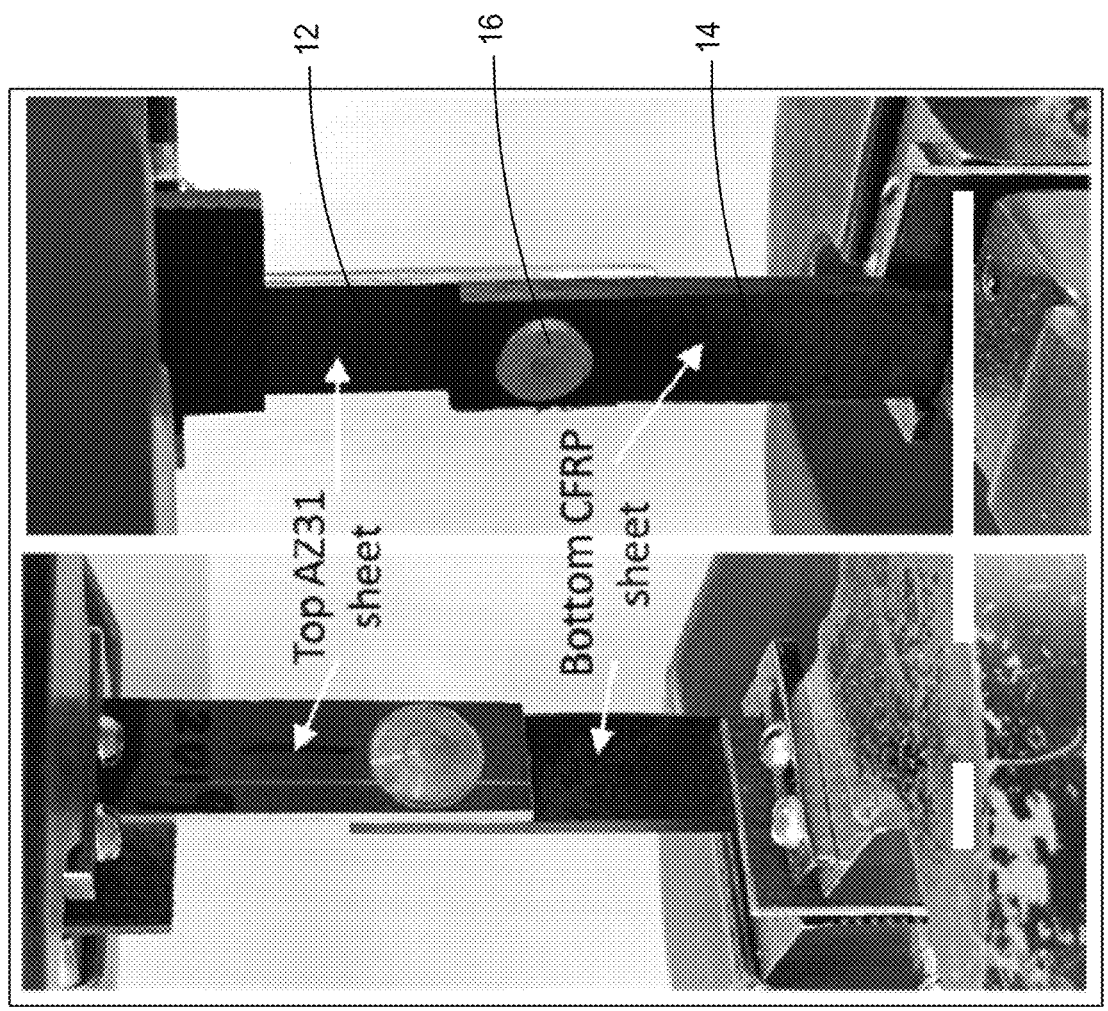
FIG. 5 is a depiction of two views of a rivet engaged with materials according to an embodiment of the disclosure undergoing tensile testing.

In accordance with example implementations of the apparatus and methods of present disclosure, as well as characterization of same, riveted AZ31/CFRP and AZ31/AA7055 joints can be cut along the center line of AZ31 inserts. Specimens for microstructural analysis can be mounted in epoxy and polished to a final surface finish of 0.05 μm using colloidal silica. Optical microscopy can be performed on cross-sections of the samples. In order to perform lap shear tensile testing, riveted AZ31/CFRP joints and AZ31/AA7055 joints can be prepared such that the width of the specimens is about 15 mm with the AZ31 insert located at the center. Lap shear tensile tests can be performed at room temperature using an MTS test frame at an extension rate of 1.27 mm/min. Example lap shear tensile test configuration of AZ31/CFRP with AZ31 insert are shown in FIG. 5.

Figure 6:
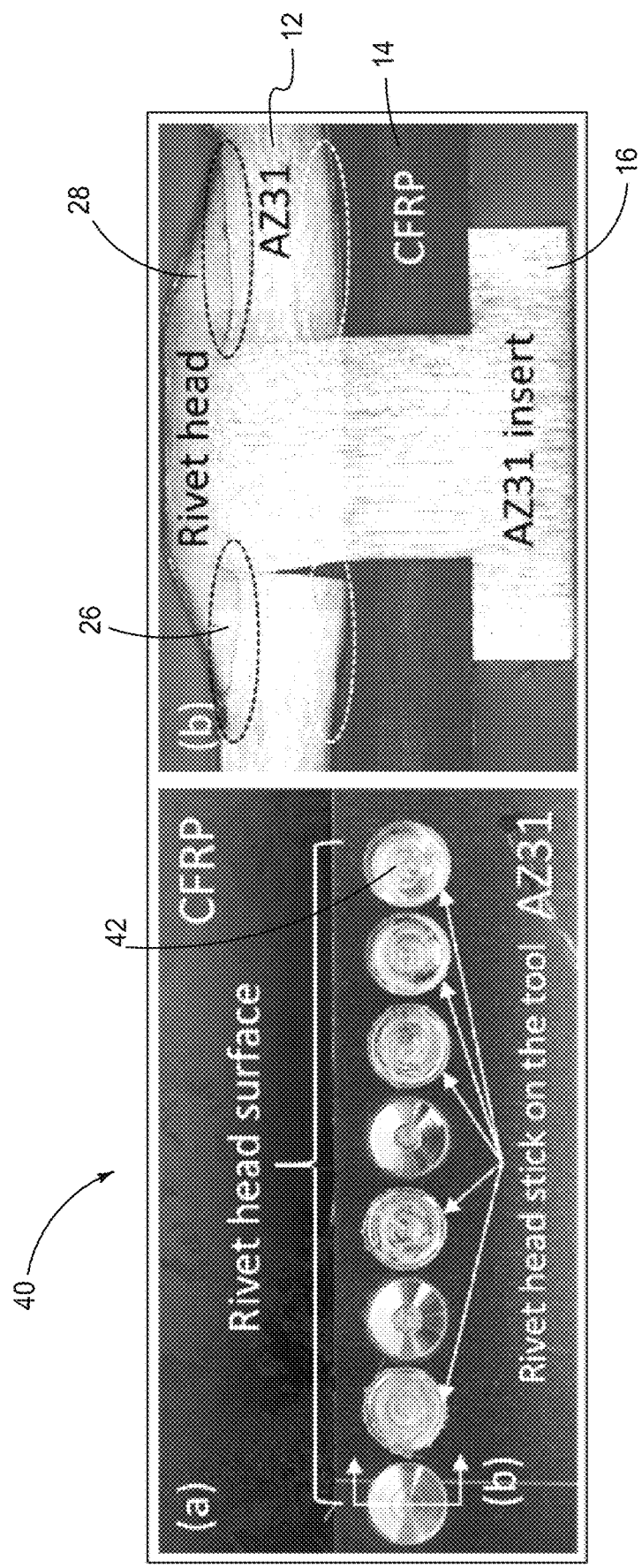
FIG. 6 is a depiction of a series of stop heads engaging dissimilar materials as well as a cross section of stop head engaged with a metal-comprising substrate after applying the riveting process according to an embodiment of the disclosure.

In addition, riveting AZ31/CFRP sheets with tool #2 can also be performed. FIG. 6 (a) depicts the rivet appearance with constant rotation rate of 1000 RPM and plunge speed of 60 mm/min. FIG. 6(a) also depicts that the rivet stop head may have a propensity to stick on the tool after riveting. FIG. 6 (b) depicts the cross-section of the rivet that displayed a good surface appearance. As can be seen in FIG. 6(b), stop head 28 mixes with metal-comprising substrate 12 at 26, for example. In some implementations, the higher concavity tool face may impede mixing at the stop head/sheet interface but may be more ideal for mixing the stop head/sheet for other material combinations and thicknesses.

Figure 7:
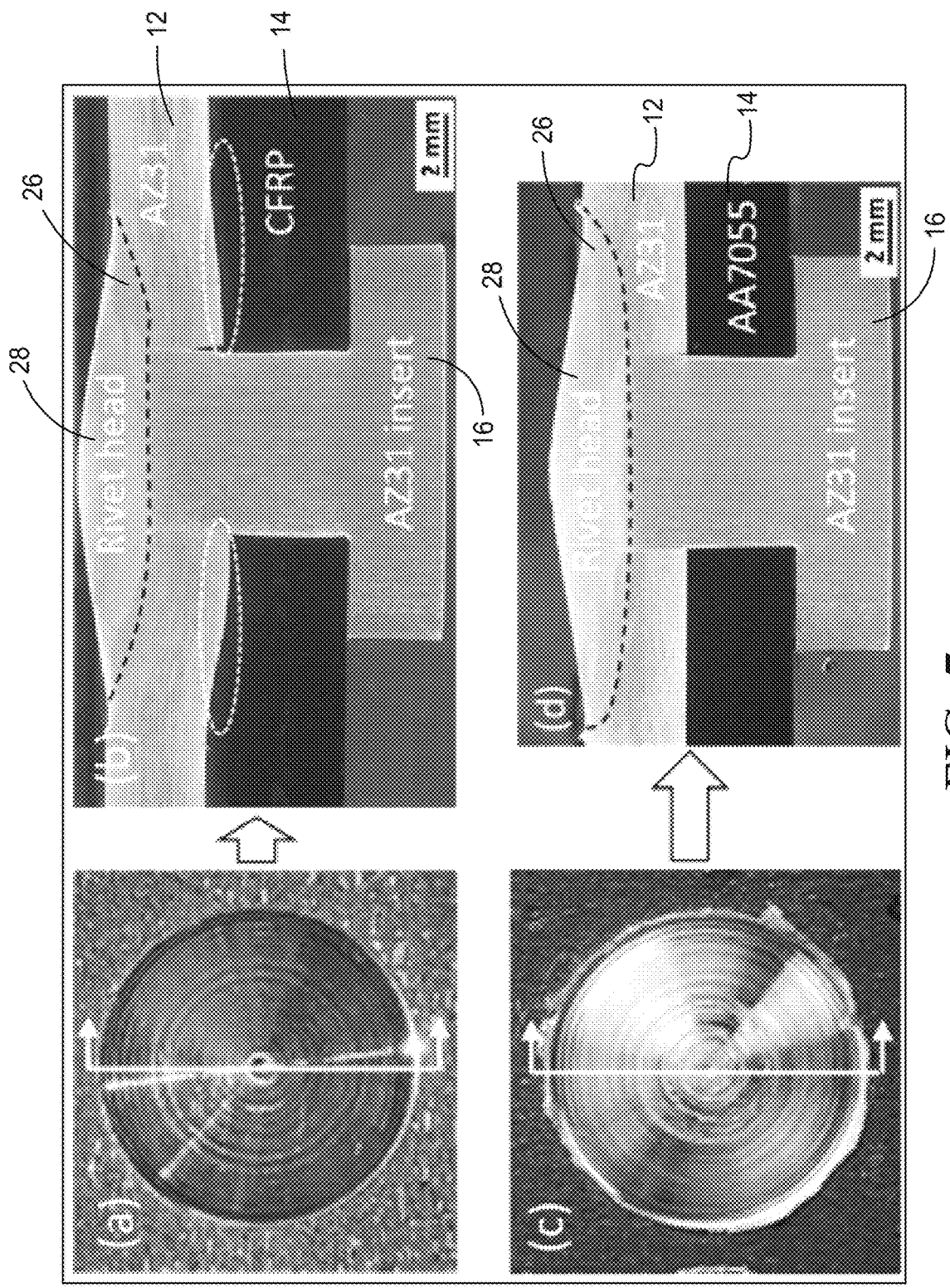
FIG. 7 depicts top views of stop heads for magnesium alloy AZ31 as well as cross sections of riveted materials according to an embodiment of the disclosure.

For riveted AZ31/CFRP sheets obtained using tool #1, the rivet surface can be shiny and completely formed (FIG. 7 (a)). The cross-section of riveted AZ31/CFRP can depict that the rivet stop head is mixed optimally with the top AZ31 sheet while some deflection of CFRP sheet is observed (FIG. 7 (b)). Comparably, for riveted AZ31/AA7055 sheets obtained with tool #1, the rivet surface can be shiny and completely formed (FIG. 7 (c)). The cross-section of riveted AZ31/AA7055 can depict that the rivet stop head is mixed sufficiently with the top AZ31 sheet (FIG. 7 (d)).

Figure 8:
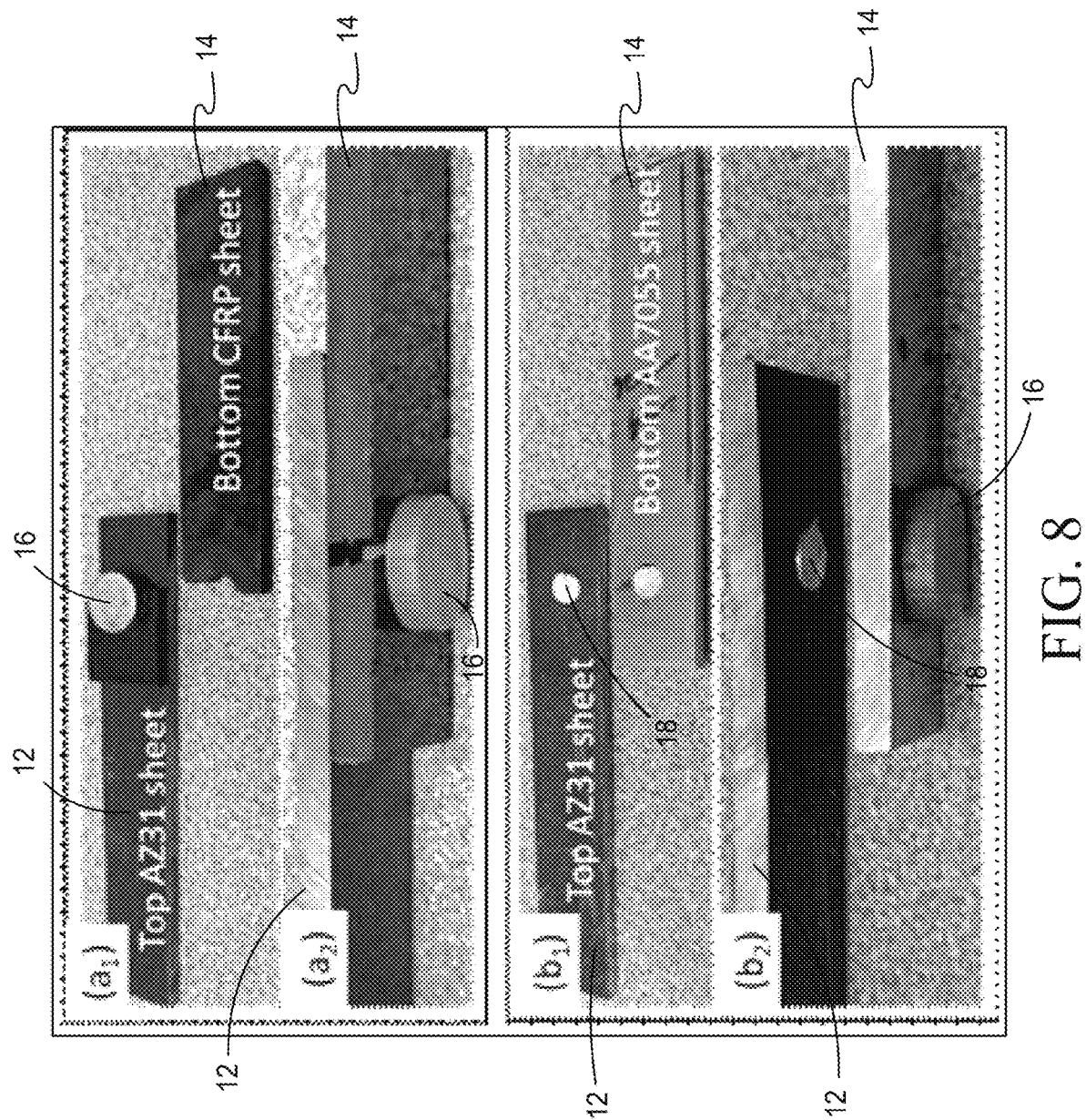
FIG. 8 is a depiction of tested riveted assemblies according to an embodiment of the disclosure.

Lap shear tensile tests can be conducted on riveted AZ31/CFRP joints and riveted AZ31/AA7055 joined by tool #1. Fracture modes can vary for riveted AZ31/CFRP and riveted AZ31/AA7055 joints. As shown in FIG. 8 ($a_{1-2}$), riveted AZ31/CFRP joints may break through the CFRP from the edges of the predrilled holes. As shown in FIG. 8 ($b_{1-2}$), riveted AZ31/AA7055 joints may break through the AZ31 rivet shaft. Lap shear tensile tests can depict that peak load of riveted AZ31/CFRP was ~1.2 kN and extension is ~0.5 mm, and peak load of riveted AZ31/AA7055 is ~2.5 kN and extension is ~1.1 mm.

RHR, its tools and/or methods, can be utilized to join AZ31/CFRP and AZ31/AA7055 assemblies using AZ31 rivets, for example. Accordingly, with RHR, the deforming rivet shafts to rivet stop head mixes with the top metal substrate and forms a metallurgical bond with the sheet being fastened.

TABLE 2

| Weld # | RPM | Plunge speed (mm/min) | PD (mm) | PD limit (mm) |
|---|---|---|---|---|
| 20-01-20#10 | 500 | 300 | 1 | 1.1 |
| 20-01-21#0 | 500 | 300 | 1.5 | 1.6 |
| 20-01-21#1 | 500 | 300 | 1.2 | 1.25 |
| 20-01-21#2 | 500 | 300 | 1.3 | 1.35 |
| 20-01-21#3 | 700 | 300 | 1.3 | 1.35 |
| 20-01-21#4 | 700 | 300 | 1.25 | 1.3 |
| 20-01-21#5 | 700 | 500 | 1.25 | 1.3 |
| 20-01-21#6 | 1000 | 500 | 1.25 | 1.3 |
| 20-01-21#7 | 1000 | 700 | 1.25 | 1.3 |
| 20-01-21#8 | 1200 | 700 | 1.25 | 1.3 |
| 20-01-21#9 | 1400 | 780 | 1.25 | 1.3 |
| 20-01-21#10 | 1600 | 780 | 1.25 | 1.3 |
| 20-01-21#11 | 1800 | 780 | 1.25 | 1.3 |
| 20-01-21#12 | 1950 | 780 | 1.25 | 1.3 |
| 20-01-21#13 | 1950 | 780 | 1.25 | 1.3 |

TABLE 2-continued

| Weld # | RPM | Plunge speed (mm/min) | PD (mm) | PD limit (mm) |
|---|---|---|---|---|
| 20-01-21#14 | 1950 | 780 | 1.25 | 1.3 |
| 20-01-21#15 | 1950 | 780 | 1.25 | 1.3 |

Figure 9:
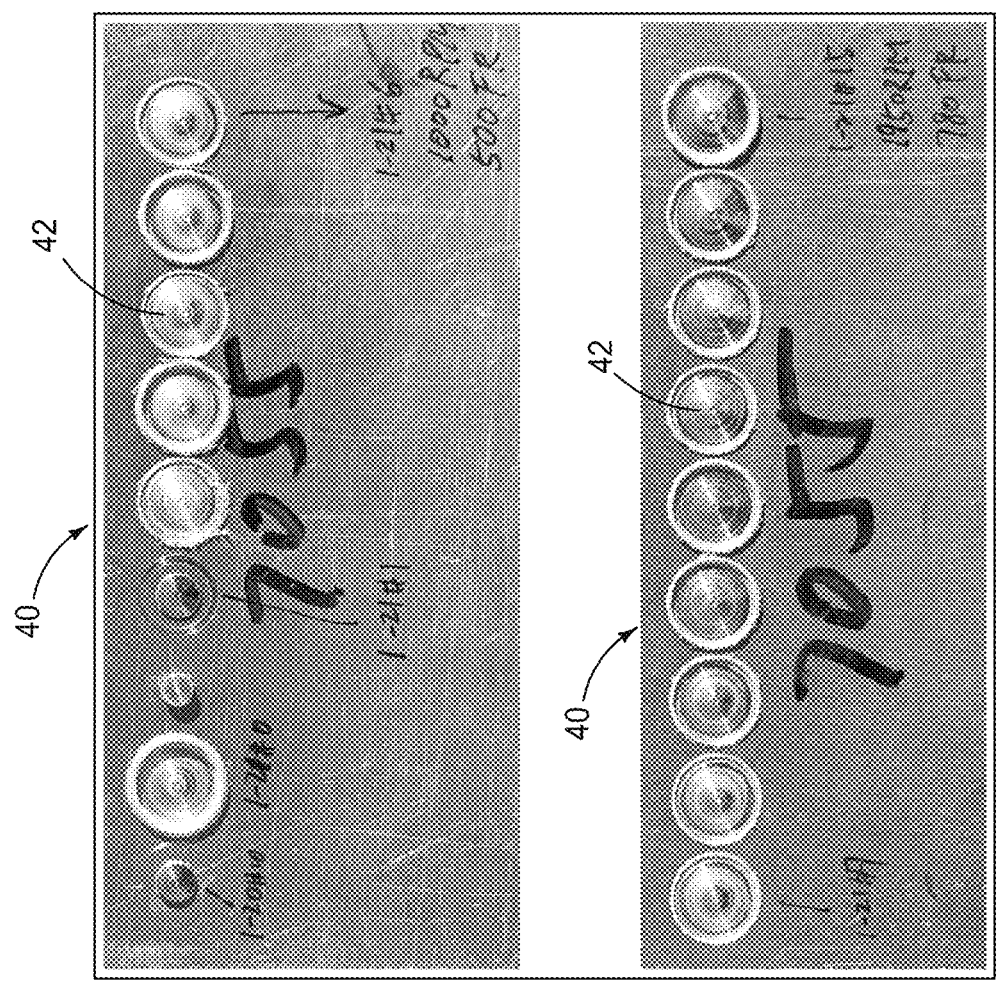
FIG. 9 is a depiction of a series of riveted assemblies with AA7075-T6 rivets metallurgically joined to a AA7055 substrate according to an embodiment of the disclosure.

As shown in FIG. 9, a series of rivets were prepared with different riveting parameters as shown in Table 2 above. The above rivets are 7XXX series rivets and more particularly 7075-T6 rivets. The metal-comprising substrate is 7XXX series as well and more particularly 7055. The 7XXX series materials have proven in most circumstances to be unrivetable. Accordingly, attempts at conventional impact riveting of 7XXX materials would result in shattered rivets when attempted at room temperature, and significantly degraded strength when attempted at elevated temperature.

Figure 10:
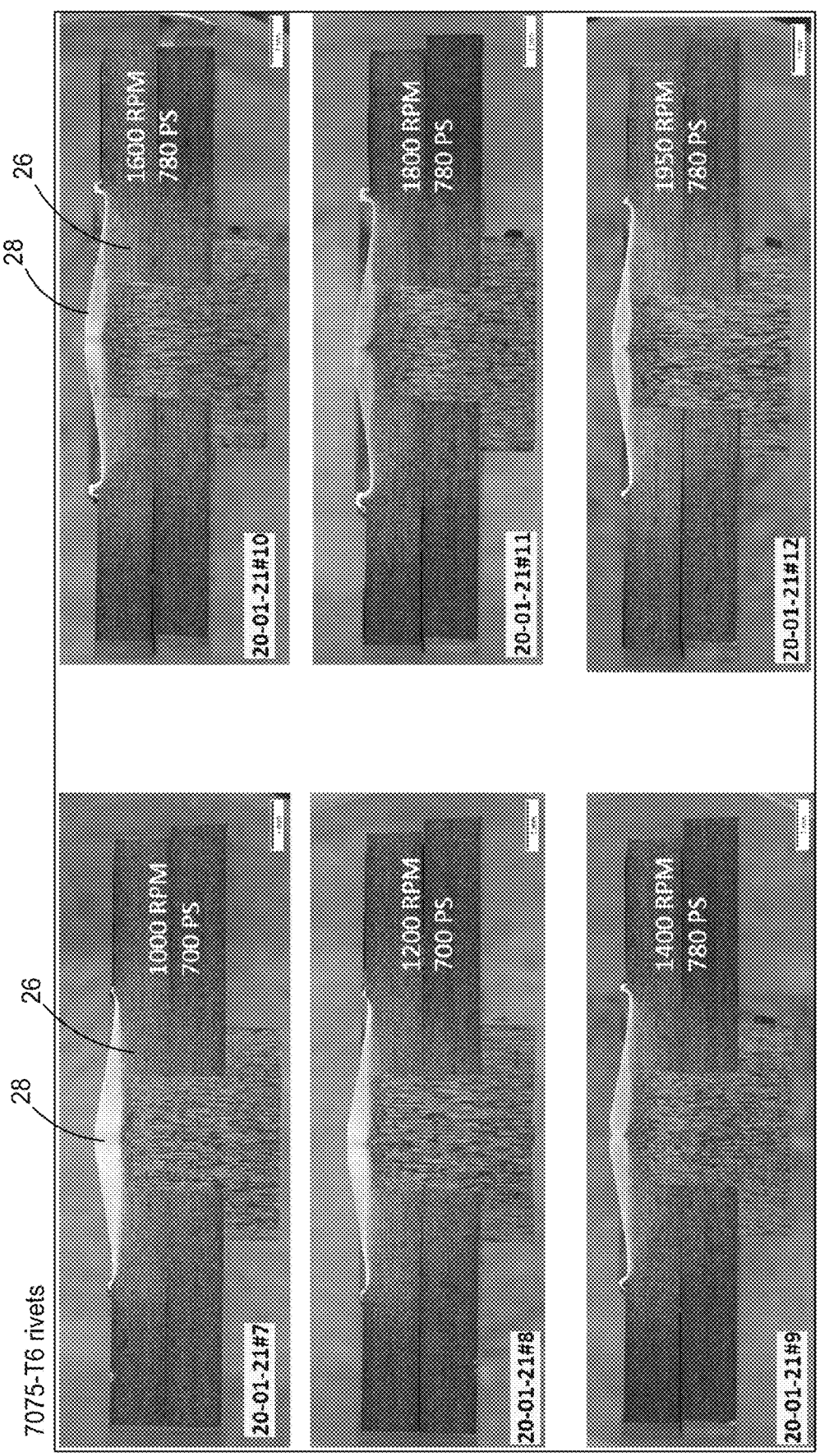
FIG. 10 depicts cross sectional views of riveted assemblies according to an embodiment of the disclosure.
Figure 11:
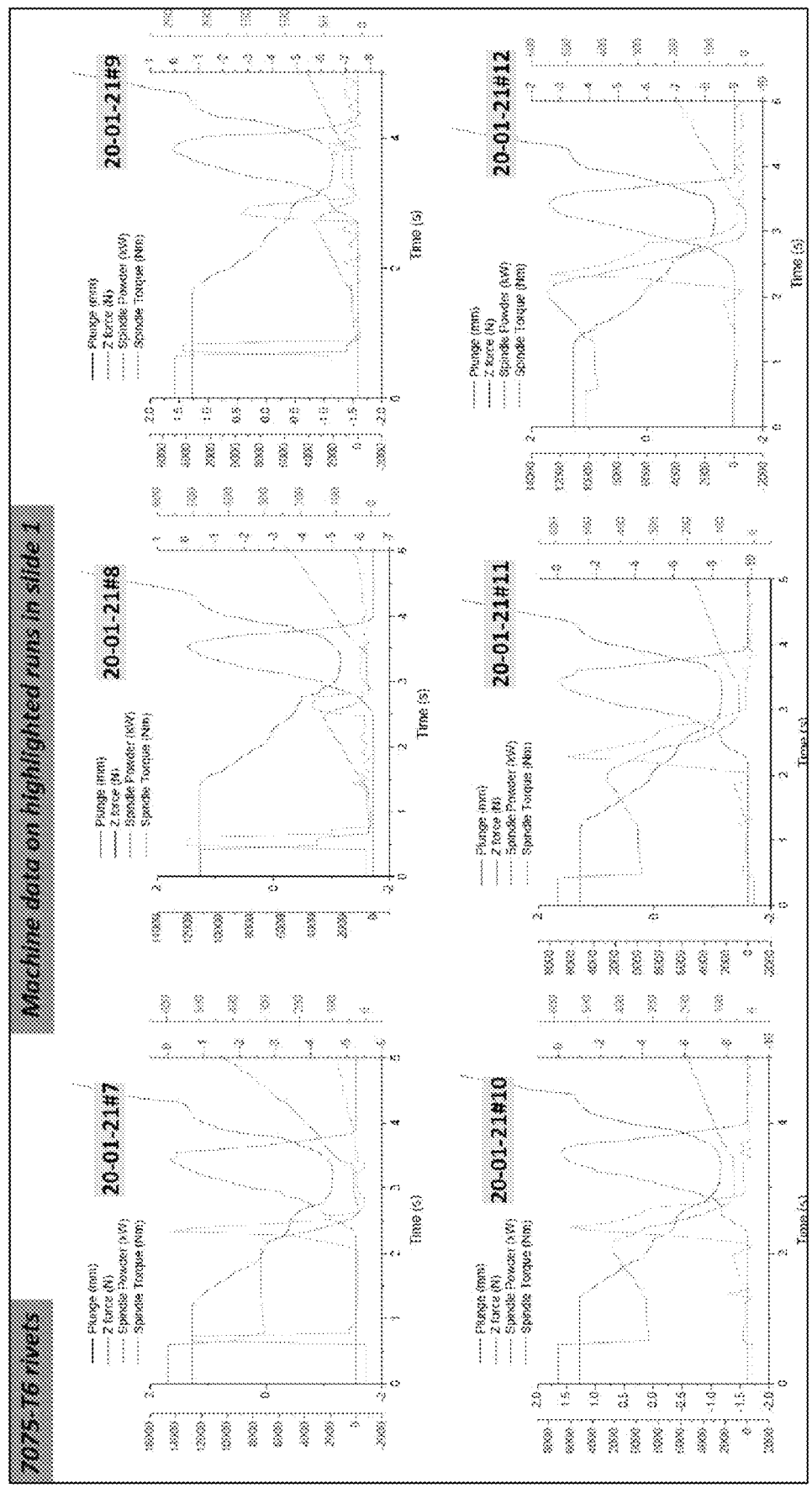
FIG. 11 depicts graphical depictions of riveting process parameters according to an embodiment of the disclosure.

Cross sections and more detailed analysis of these rivets are shown with reference to FIG. 10. As shown in FIG. 10, the cross section of the identified rivets in FIG. 10 are shown with mixed materials 26 below and engaged with stop head 28. Referring next to FIG. 11, riveting process parameters are shown in graphical form.

Figure 12:
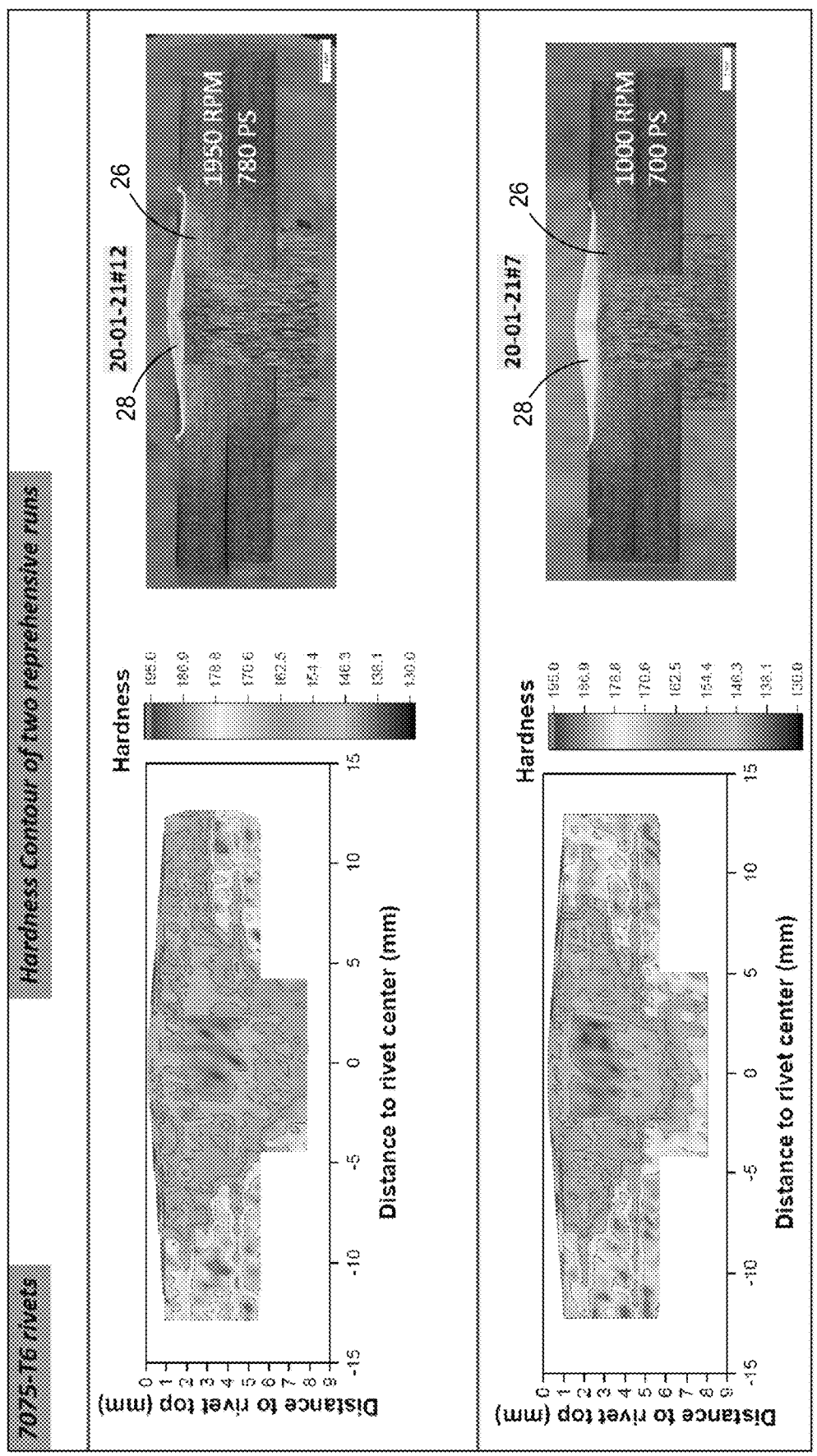
FIG. 12 is a depiction of hardness distribution as well as cross sectional depictions of riveted AA7075-T6 materials according to an embodiment of the disclosure.

Referring next to FIG. 12, a more detailed view of particular riveted assemblies is shown with mixed materials 26 and rivet stop head 28. More particularly, the hardness distribution of these materials is shown in FIG. 12 as well for AA7075-T6 rivets and AA7075 sheets.

TABLE 3

| Weld # | RPM | Plunge speed (mm/min) | PD (mm) | PD limit (mm) |
|---|---|---|---|---|
| 20-02-20#5 | 1000 | 500 | 1.6 | 1.65 |
| 20-02-20#8 | 1000 | 500 | 1.2 | 1.25 |
| 20-02-20#9 | 1000 | 500 | 1.2 | 1.25 |
| 20-02-20#10 | 1000 | 500 | 1.2 | 1.25 |
| 20-02-20#11 | 1200 | 500 | 1.2 | 1.25 |
| 20-02-20#12 | 1200 | 780 | 1.2 | 1.25 |
| 20-02-20#13 | 1500 | 780 | 1.2 | 1.25 |
| 20-02-20#14 | 1950 | 780 | 1.2 | 1.25 |
| 20-02-20#15 | 1950 | 780 | 1.2 | 1.25 |

Figure 13:
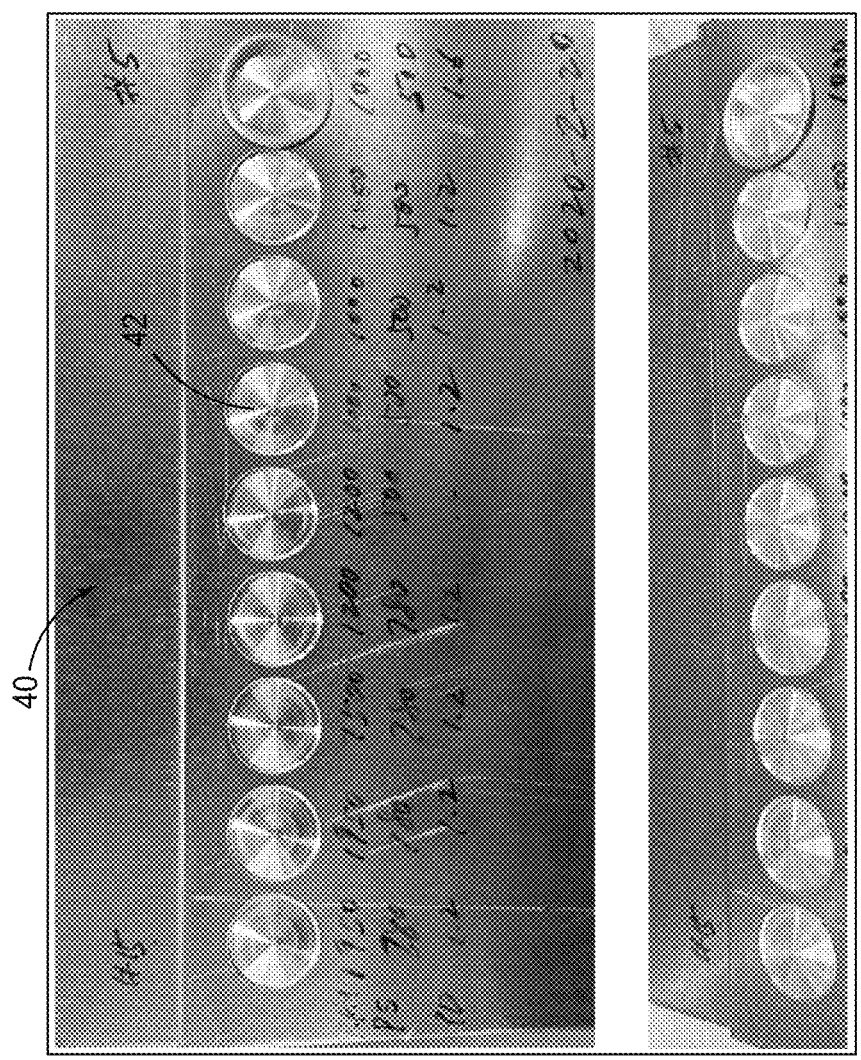
FIG. 13 is a depiction of a series of riveted AA2024-T351 materials according to an embodiment of the disclosure.

Referring next to FIG. 13, a series of rivets are shown between two materials as 40 and individual rivets 42 that have been prepared consistent with Table 3 above. These are 2XXX series rivets, particularly 2024-T351 rivets. These rivets have been used in the full tempered and hardened condition, in contrast with conventional impact riveting they needed to be kept at freezing temperatures to retain the softened annealed condition and must be used immediately after removal from the freezer to avoid hardening before being used as rivets. Rather, in accordance with the present disclosure, these rivets were used at room temperature in the fully tempered and hardened condition and did not require annealing or storage in a freezer prior to riveting. The metal comprising material is 2XXX series, particularly 2024-T3 sheets.

Figure 14:
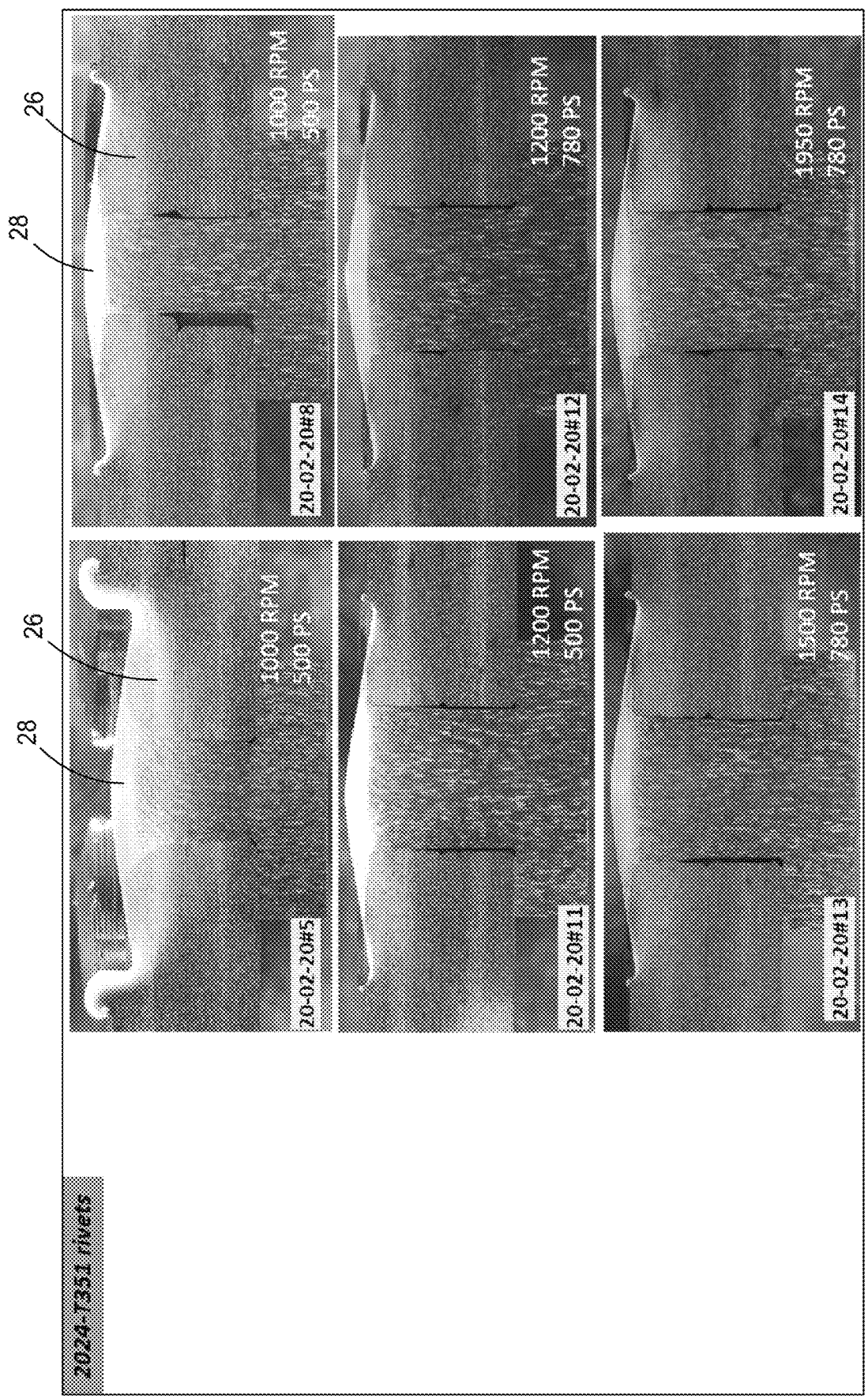
FIG. 14 depicts cross sectional views of riveted AA2024-T351 materials according to an embodiment of the disclosure.
Figure 15:
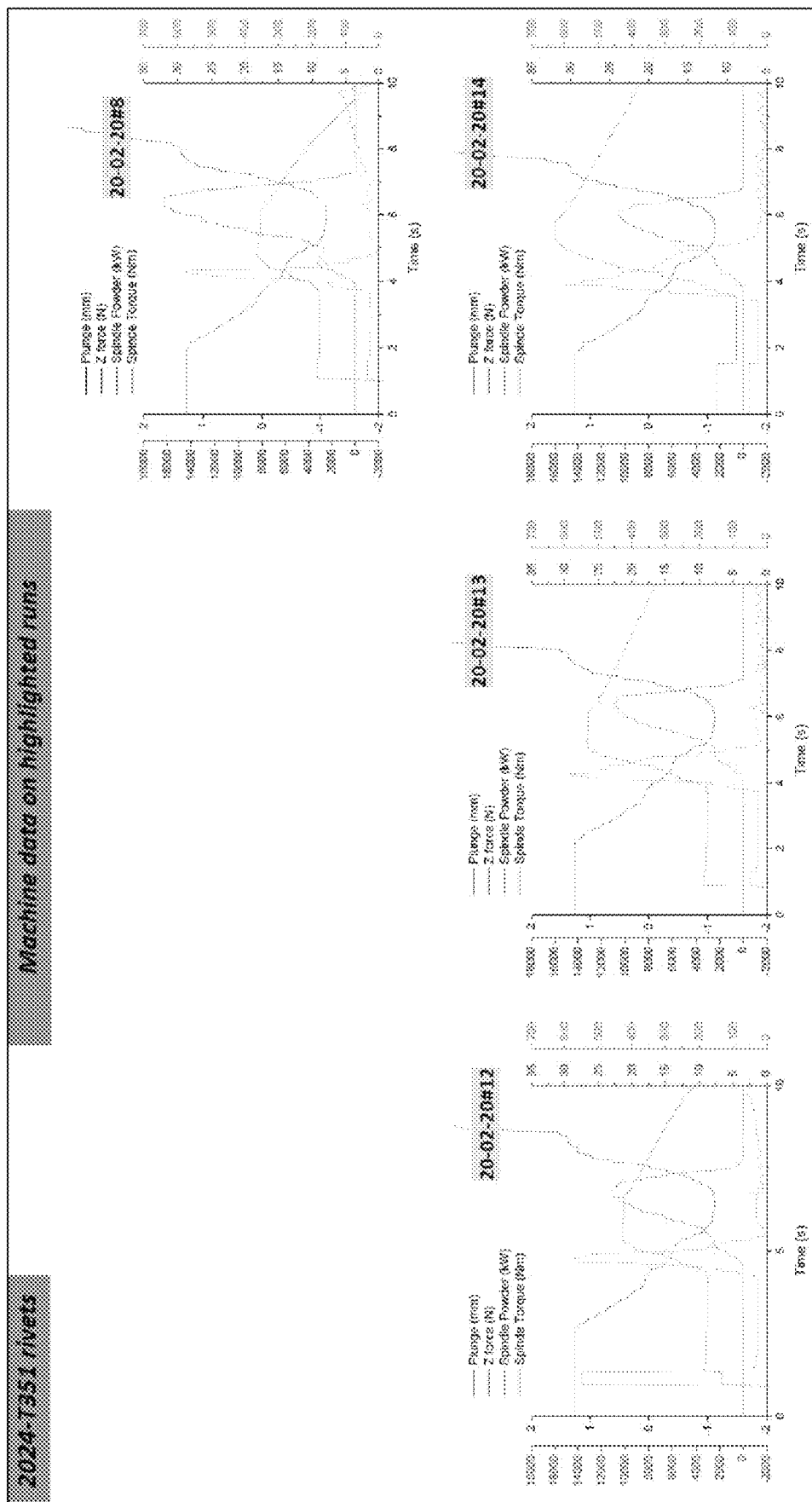
FIG. 15 is a depiction of riveting process parameters according to an embodiment of the disclosure.
Figure 16:
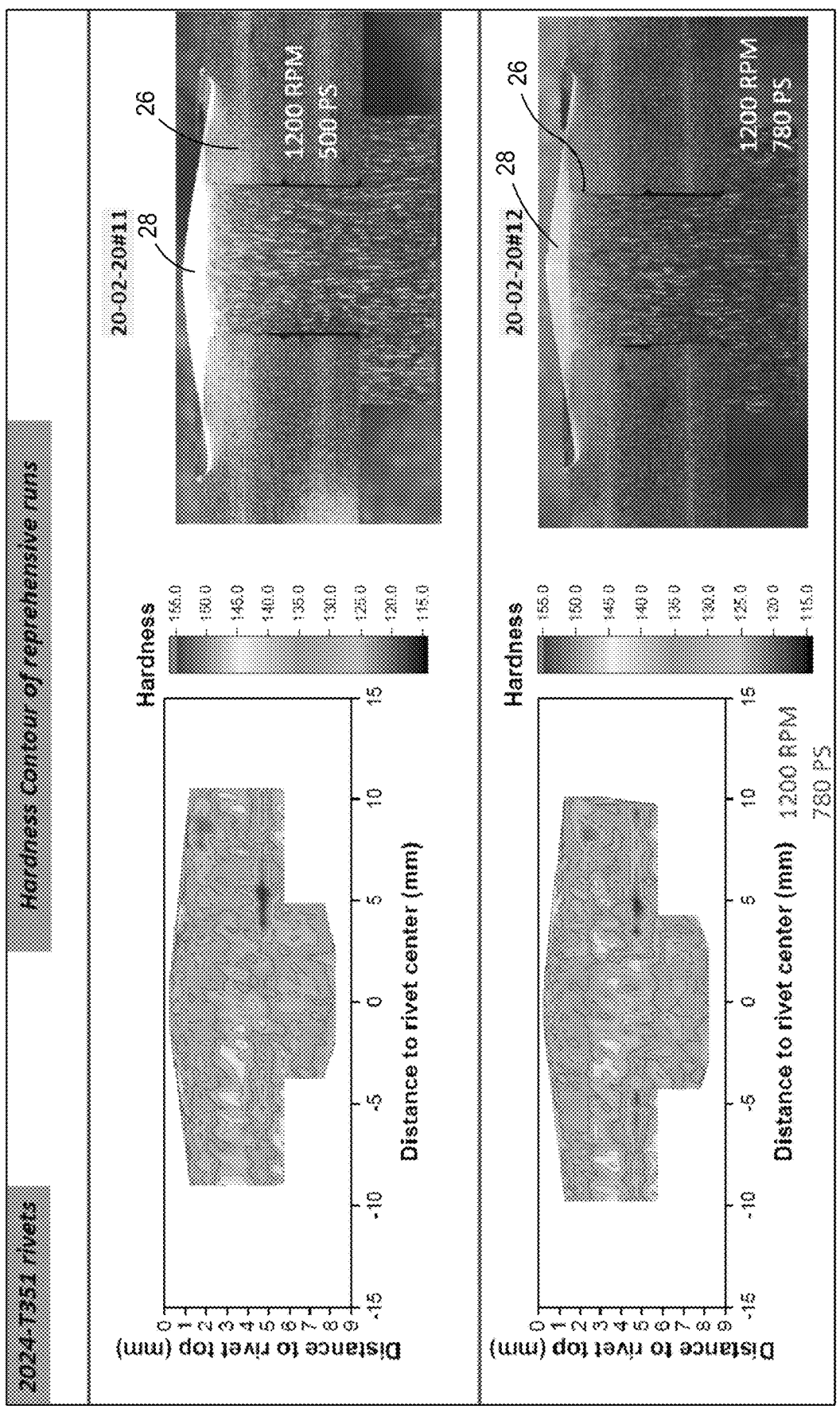
FIG. 16 is a hardness depiction as well as cross sectional views of AA2024-T351 riveted materials according to an embodiment of the disclosure.
Figure 17:
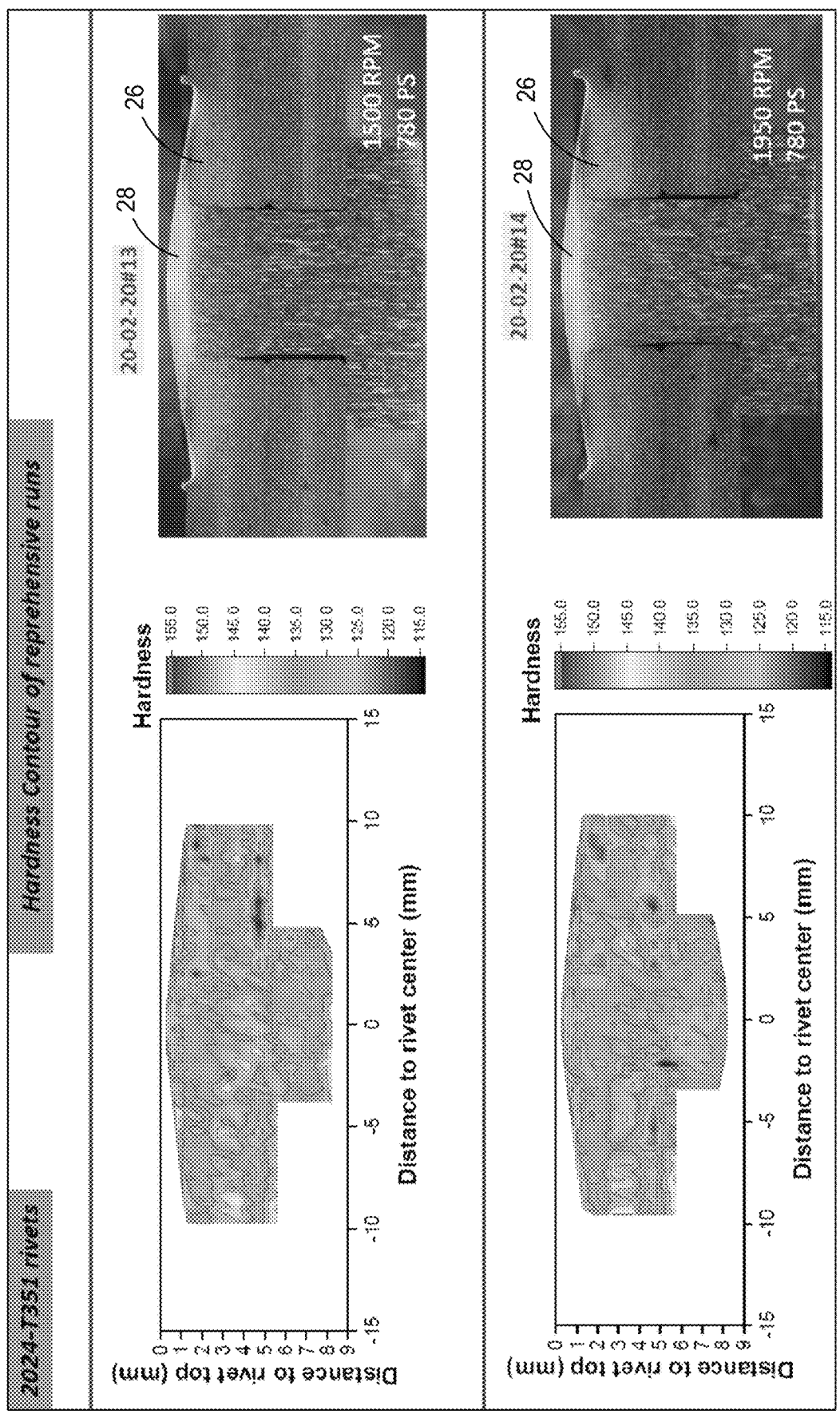
FIG. 17 is hardness as well as cross sectional views of riveted AA2024-T351 materials according to an embodiment of the disclosure.

Referring next to FIG. 14, cross sectional views of these riveting assemblies are shown depicting mixed materials as well as stop head 28. Referring next to FIG. 15, graphical depictions of rivet process parameters are shown in detail. Referring next to FIG. 16, at least two cross sections as well as hardness distribution of each of those cross sections are depicted showing mixed materials and the rivet/sheet interface as well as rivet stop head 28. Referring to FIG. 17, again the stop head 28 is shown as well as mixed materials at the rivet/sheet interface.

As can be seen, the metal-comprising substrate 12 can be different from substrate material 14. In accordance with example implementations, the substrate material 14 can be metal, CFRP or other materials. It can also be an alloy, and in certain implementations, substrate 14 can include aluminum, magnesium, steel, ceramic, or thermoset plastic, for example. In accordance with other example implementations, the metal-comprising substrate can be an alloy as well. This metal-comprising substrate can comprise aluminum and/or magnesium, for example. The metallurgical bond between the metal-comprising substrate and the stop head can be a mixture of the material of the stop head and the material of the metal-comprising substrate.

In accordance with example implementations, the metal-comprising substrate surface, typically the upper surface of the metal-comprising substrate, and at least a portion of the surface can be mixed with, and metallurgically bonded to, the rivet stop head, typically the lower portion of the rivet stop head. In accordance with example implementations, the portion of the rivet stop head can be engaged with the surface of the metal-comprising substrate. At least a portion of the surface can be metallurgically bonded with the metal-comprising substrate, and that surface of the metal-comprising substrate and/or the rivet can extend from the shaft of the rivet itself, or extend about the shaft of the rivet itself. Accordingly, at least a portion of the shaft of the rivet can be metallurgically bonded with the metal-comprising substrate. In accordance with example implementations, both the metal-comprising substrate 12 and the substrate 14 can be alloys. They can be slightly different alloys, but they can also be dissimilar materials. They also can be similar alloys.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:
1. A riveted assembly comprising:
a substrate extending between two ends to define opposing substrate surfaces having a first opening extending between the opposing substrate surfaces;
a metal-comprising substrate extending between the two ends to define opposing metal-comprising substrate surfaces having a second opening extending between the opposing metal-comprising substrate surfaces, wherein the first and second openings complement one another when the substrate and metal-comprising substrate are engaged; and
a rivet comprising a shaft extending between a rivet head and a rivet stop head, the shaft extending through the first and second openings, the rivet head engaging the substrate, and the rivet stop head engaging the metal-comprising substrate, at least a portion of the rivet stop head mixing with, and forming a metallurgical bond with the metal-comprising substrate.

2. The riveted assembly of claim 1 wherein the substrate is a polymeric.

3. The riveted assembly of claim 1 wherein the substrate is carbon fiber reinforced polymer.

4. The riveted assembly of claim 1 wherein the substrate is an alloy.

5. The riveted assembly of claim 1 wherein the substrate comprises aluminum.

6. The riveted assembly of claim 1 wherein the substrate comprises steel.

7. The riveted assembly of claim 1 wherein the substrate comprises ceramic.

8. The riveted assembly of claim 1 wherein the metal-comprising substrate is an alloy.

9. The riveted assembly of claim 1 wherein the metal-comprising substrate comprises aluminum and/or an aluminum alloy.

10. The riveted assembly of claim 1 wherein the metal-comprising substrate comprises magnesium and/or an aluminum alloy.

11. The riveted assembly of claim 1 wherein the metallurgical bond is a mixture of the material of the stop head and the material of the metal-comprising substrate.

12. The assembly of claim 11 wherein the rivet stop head defines a surface engaged with the surface of the metal-comprising substrate.

13. The assembly of claim 12 wherein at least a portion of the surface is metallurgically bonded with the metal-comprising substrate.

14. An assembly comprising a rivet comprising a rivet shaft extending between a rivet head and a rivet stop head, wherein the rivet stop head is metallurgically bonded with a metal-comprising substrate and wherein the metal-comprising substrate defines a surface, at least a portion of the surface being metallurgically bonded to the rivet stop head.

15. The assembly of claim 14 wherein the portion of the surface extends from the shaft of the rivet.

16. The assembly of claim 14 wherein the portion of the surface extends about the shaft of the rivet.

17. The assembly of claim 14 further comprising wherein at least a portion of the shaft of the rivet is metallurgically bonded with the metal-comprising substrate.

\* \* \* \* \*

UNITED STATES PATENT AND TRADEMARK OFFICE
CERTIFICATE OF CORRECTION

PATENT NO. : 11,549,532 B1  
APPLICATION NO. : 17/014363  
DATED : January 10, 2023  
INVENTOR(S) : Scott A. Whalen et al.

Page 1 of 2

It is certified that error appears in the above-identified patent and that said Letters Patent is hereby corrected as shown below:

On the Title Page

(56) References Cited, page 2, 2nd Column, 25th/26th Lines - Replace
"WO PCT/US2019/040730 10/2019" with
--WO PCT/US2019/040730 Search Report 10/2019
WO PCT/US2019/040730 Written Opinion 10/2019--

(56) References Cited, page 2, 2nd Column, 27th/28th Line - Replace
"WO PCT/US2019/040730 1/2021" with
--WO PCT/US2019/040730 IPRP 1/2021--

(56) References Cited, page 2, 2nd Column, 29th/30th Line - Replace
"WO PCT/US2020/053168 2/2021" with
--WO PCT/US2020/053168 Search Report 2/2021
WO PCT/US2020/053168 Written Opinion 2/2021--

(56) References Cited, page 3, 1st Column, 6th Line - Replace
"Back Extrusion", Scripta Materials, 66, 2012, United States, 615-" with
--Back Extrusion", Scripta Materialia, 66, 2012, United States, 615- --

In the Specification

Column 3, Line 51 - Replace "in manufacturing" with --in the manufacturing--

Column 3, Line 65 - Replace "Mg/Al Al/Steel" with --Mg/Al, Al/Steel--

Column 5, Line 3 - Replace "opposing stope" with --opposing stop--

Column 5, Line 23 - Replace "($D_{tool}$)" with --($D_\text{tool}$)--

Signed and Sealed this  
Eighth Day of August, 2023

Katherine Kelly Vidal  
*Director of the United States Patent and Trademark Office*

CERTIFICATE OF CORRECTION (continued)  Page 2 of 2
U.S. Pat. No. 11,549,532 B1

Column 5, Line 25 - Replace "($V_{cap}$) and cap height ($H_{cap}$)." with --($V_{\text{cap}}$) and cap height ($H_{\text{cap}}$).--

Column 5, Line 28 - Replace "($H_{insert}$)" with --($H_{\text{insert}}$)--

Column 5, Line 29 - Replace "($V_{insert}$)" with --($V_{\text{insert}}$)--

Column 5, Line 33 - Replace "$H_{cap}$ of 0.5 mm and $V_{cap}$ of" with --$H_{\text{cap}}$ of 0.5 mm and $V_{\text{cap}}$ of--

Column 5, Line 34 - Replace "$H_{cap}$ of 1.1 mm" with --$H_{\text{cap}}$ of 1.1 mm--

Column 5, Line 35 - Replace "$V_{cap}$ of 60.8 mm$^3$." with --$V_{\text{cap}}$ of 60.8 mm$^3$.--

Column 5, Line 36 - Replace "of the both tools" with --of both of the tools--